US008416798B2

(12) United States Patent
Chien

(10) Patent No.: US 8,416,798 B2
(45) Date of Patent: Apr. 9, 2013

(54) FEMTOCELL AND PARAMETER GENERATING METHOD THEREOF

(75) Inventor: Chia-Chun Chien, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 705 days.

(21) Appl. No.: 12/649,553

(22) Filed: Dec. 30, 2009

(65) Prior Publication Data

US 2011/0105114 A1    May 5, 2011

(30) Foreign Application Priority Data

Nov. 5, 2009    (CN) .......................... 2009 1 0309346

(51) Int. Cl.
*H04J 4/00* (2006.01)

(52) U.S. Cl.
USPC ............ 370/436; 370/437; 370/458; 370/462

(58) Field of Classification Search .................. 370/338, 370/437, 436, 458, 462
See application file for complete search history.

(56) References Cited

U.S. PATENT DOCUMENTS

2008/0268856 A1    10/2008    Francalanci et al.
2010/0111013 A1 *   5/2010    Chou ............................ 370/329
2010/0124930 A1 *   5/2010    Andrews et al. .............. 455/436
2010/0216478 A1 *   8/2010    Buddhikot et al. ........... 455/450
2011/0090864 A1 *   4/2011    Nylander et al. ............. 370/331

FOREIGN PATENT DOCUMENTS

CN    101364910 A    2/2009

* cited by examiner

*Primary Examiner* — Huy D Vu
*Assistant Examiner* — Omer Mian
(74) *Attorney, Agent, or Firm* — Altis Law Group, Inc.

(57) ABSTRACT

A femtocell in communication with a centralized server and a communication terminal obtains an available frequency range of a telecom operator via the Internet, detects communication parameters of neighboring femtocells and macrocells according to the obtained available frequency range, and randomly generates a set of communication parameters suitable for the femtocell according to the detected communication parameters. The femtocell further requires the centralized server to confirm availability of the set of generated communication parameters, and employs the generated communication parameters to communicate with the communication terminal if the set of generated communication parameters is available.

6 Claims, 3 Drawing Sheets

FEMTOCELL AND PARAMETER GENERATING METHOD THEREOF

BACKGROUND

1. Technical Field

Embodiments of the present disclosure relate to wireless communication, and more particularly to a femtocell and a parameter generating method thereof.

2. Description of Related Art

In wireless communication systems, it is very important to allocate and manage frequency resources of base stations. Generally, a telecom operator distributes a large number of base stations and configures a set of communication parameters, such as a UTRA absolute radio frequency channel number (UARFCN) and a primary scrambling code (PSC), for each of the base stations according to the frequency resources allocated to the telecom operator.

A femtocell is a micro miniature and mobile base station for 3G and mobile broadband communication. A femtocell may be located at each home, which obviously generates a large number of femtocells, each requiring a unique set of communication parameters. Therefore, it is very important and difficult to distribute such a large number of femtocells.

However, interference of the communication parameters between a femtocell and neighboring femtocells and neighboring macrocells in a small scale around the femtocell cannot be quickly and practically estimated. In addition, the general configuration of the communication parameters to the base station cannot be employed for the femtocells. Therefore, a need exists for a femtocell that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
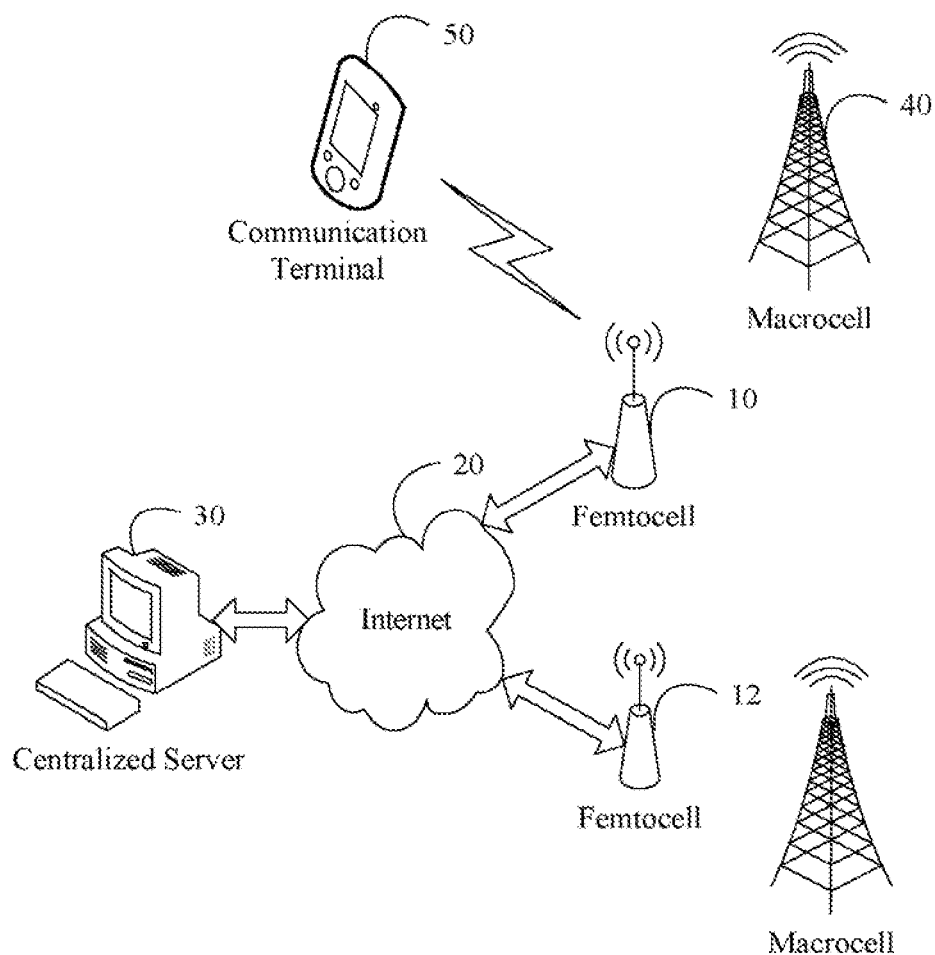
FIG. 1 is a schematic diagram of an application environment of one embodiment of a femtocell of the present disclosure.

FIG. 1 is a schematic diagram of an application environment of one embodiment of a femtocell 10 of the present disclosure. The femtocell 10 radiates signals over a small surrounding area containing a plurality of femtocells and macrocells. In FIG. 1, a neighboring femtocell 12 represents femtocells neighboring the femtocell 10. A macrocell 40 represents macrocells neighboring the femtocell 10. The femtocell 10 is operable to configure a set of communication parameters for itself and employ the set of communication parameters to communicate with a communication terminal 50, such as a notebook, a mobile phone, and the others. In one embodiment, the set of communication parameters includes a UTRA absolute radio frequency channel number (UARFCN) and a primary scrambling code (PSC).

In one embodiment, the femtocell 10, the neighboring femtocell 12, and the macrocell 40 all communicate with communication terminals, such as notebooks, mobile phones, and the others, via a centralized server 30. The centralized server 30 further communicates with other femtocells and other macrocells outside of the small radiation scale of the femtocell 10. The centralized server 30 includes a database 300 which stores all femtocells and macrocells that have generated the communication parameters via the centralized server 30. The femtocell 10 can configure the set of communication parameters for itself via the centralized server 30, which avoids interference with the femtocells and the macrocells inside and outside of the small radiation scale of the femtocell 10.

Figure 2:
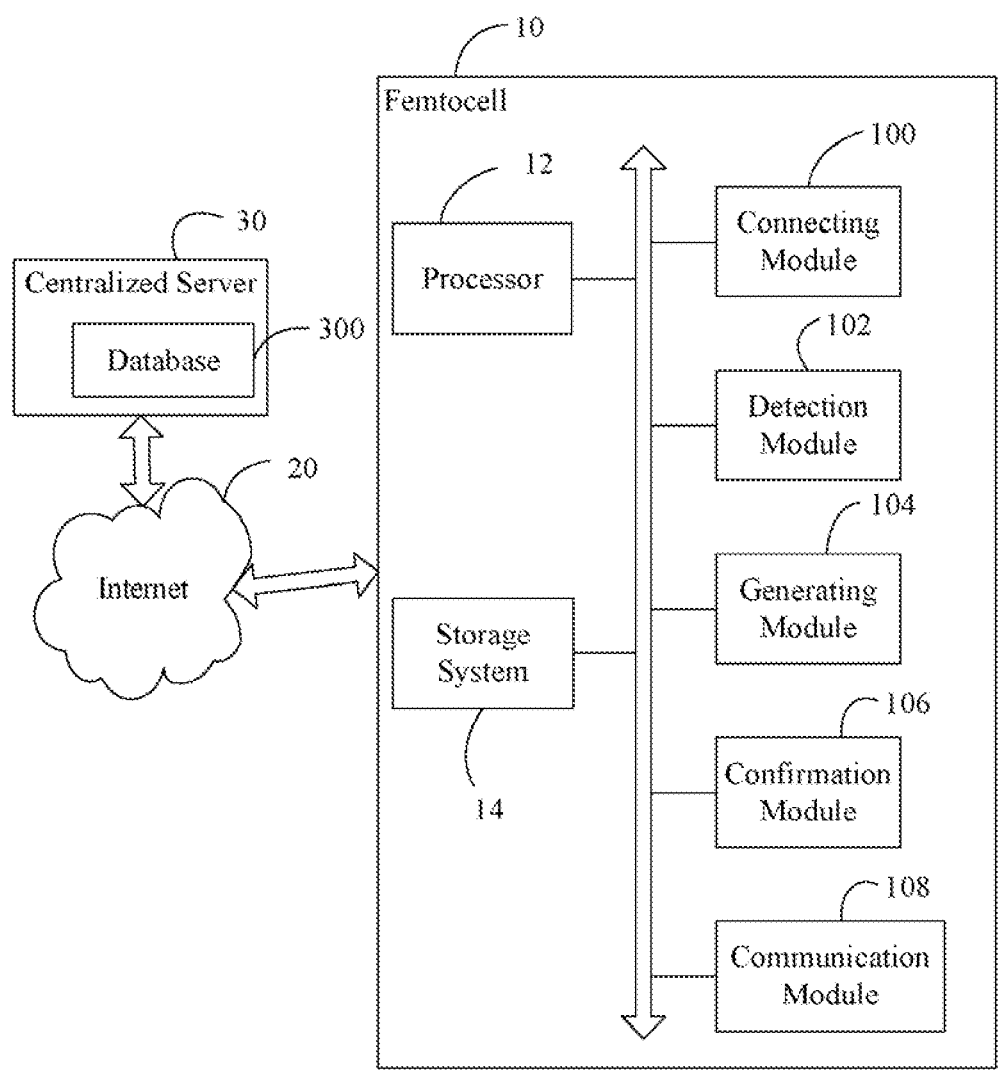
FIG. 2 is a schematic diagram of functional modules of one embodiment of a femtocell of the present disclosure.

FIG. 2 is a schematic diagram of functional modules of one embodiment of the femtocell 10 of the present disclosure.

In one embodiment, the femtocell 10 includes a processor 12, a storage system 14, a connecting module 100, a detection module 102, a generating module 104, a confirmation module 106, and a communication module 108. The modules 100-108 may include one or more computerized instructions stored in the storage system 14 and executed by the at least one processor 12.

The connecting module 100 is operable to connect to the Internet 20, and obtain an available frequency range of a telecom operator via the Internet 20. The frequency range of a telecom operator is frequency resource distributed to the telecom operator. The telecom operator is permitted to operate wireless communication in the frequency range. In one embodiment, the telecom operator inputs the available frequency range distributed to the telecom operator by an operating support system (OSS). The connecting module 100 builds an IP tunnel to access the Internet 20 and obtains the available frequency range input by the telecom operator by TR069 mechanism, in one example.

The detection module 102 is operable to detect communication parameters of neighboring femtocells 12 and macrocells 40 according to the obtained available frequency range. Each cell has a unique set of communication parameters. If two cells, such as a femtocell and a macrocell, or two femtocells, share a set of communication parameters, the two cells will interfere each other, such that one is unable to communicate with the communication terminal 50 by the set of communication parameters. In one embodiment, the detection module 102 detects the neighboring femtocells 12 and macrocells 40 which work within the obtained available frequency range by a sniffer function of the femtocell 10, and obtains the communication parameters of neighboring femtocells 12 and macrocells 40.

The generating module 104 is operable to randomly generate a set of communication parameters suitable for the femtocell 10 according to the detected communication parameters. In one embodiment, the generating module 104 randomly generates a set of communication parameters suitable for the femtocell 10 which are not equal to the communication parameters detected by the detection module 102.

The confirmation module 106 is operable to require the centralized server 30 to confirm availability of the set of generated communication parameters. In one embodiment, availability of the set of generated communication parameters indicates that the set of generated communication parameters is allowed by the centralized server 30 and has not yet been employed by other femtocells and macrocells that have generated the communication parameters via the centralized server 30. Unavailability of the set of generated communication parameters indicates that the set of generated communication parameters is not allowed by the centralized server 30 or has been employed by other femtocells and the macrocells that have generated the communication parameters via the centralized server 30.

In one embodiment, the confirmation module 106 sends the generated communication parameters to the centralized server 30 and starts a timer having a predetermined time period. The confirmation module 106 awaits confirmation of the centralized server 30 during the predetermined time period. The confirmation module 106 has a warming mechanism providing notification that the network is busy if the confirmation module does not receive the confirmation of the centralized server 30 before timeout of the predetermined time period.

At the same time, the centralized server 30 receives the generated communication parameters from the femtocell 10, and determines if the set of generated communication parameters is allowed and has not been employed by the other femtocells, and the macrocells that have generated the communication parameters via the centralized server 30. The centralized server 30 confirms availability of the set of generated communication parameters and adds the generated communication parameters to the database 300 if the set of generated communication parameters is allowed and has not been employed by the other femtocells and the macrocells that have generated the communication parameters via the centralized server 30. Alternatively, the centralized server 30 confirms unavailability of the set of generated communication parameters if the set of generated communication parameters is not allowed by the centralized server 30 or has been employed by the other femtocells and the macrocells that have generated the communication parameters via the centralized server 30.

The generating module 104 randomly generates another set of communication parameters suitable for the femtocell 10 according to the detected communication parameters if the centralized server 30 confirms that the set of generated communication parameters is unavailable.

The communication module 108 is operable to use the generated communication parameters to communicate with the communication terminal 50 if the centralized server 30 confirms availability of the set of generated communication parameters. As such, the set of generated communication parameters is unique. Therefore, the communication module 108 communicates with the communication terminal 50 without interference with the neighboring femtocells 12 and macrocells 40.

Figure 3:
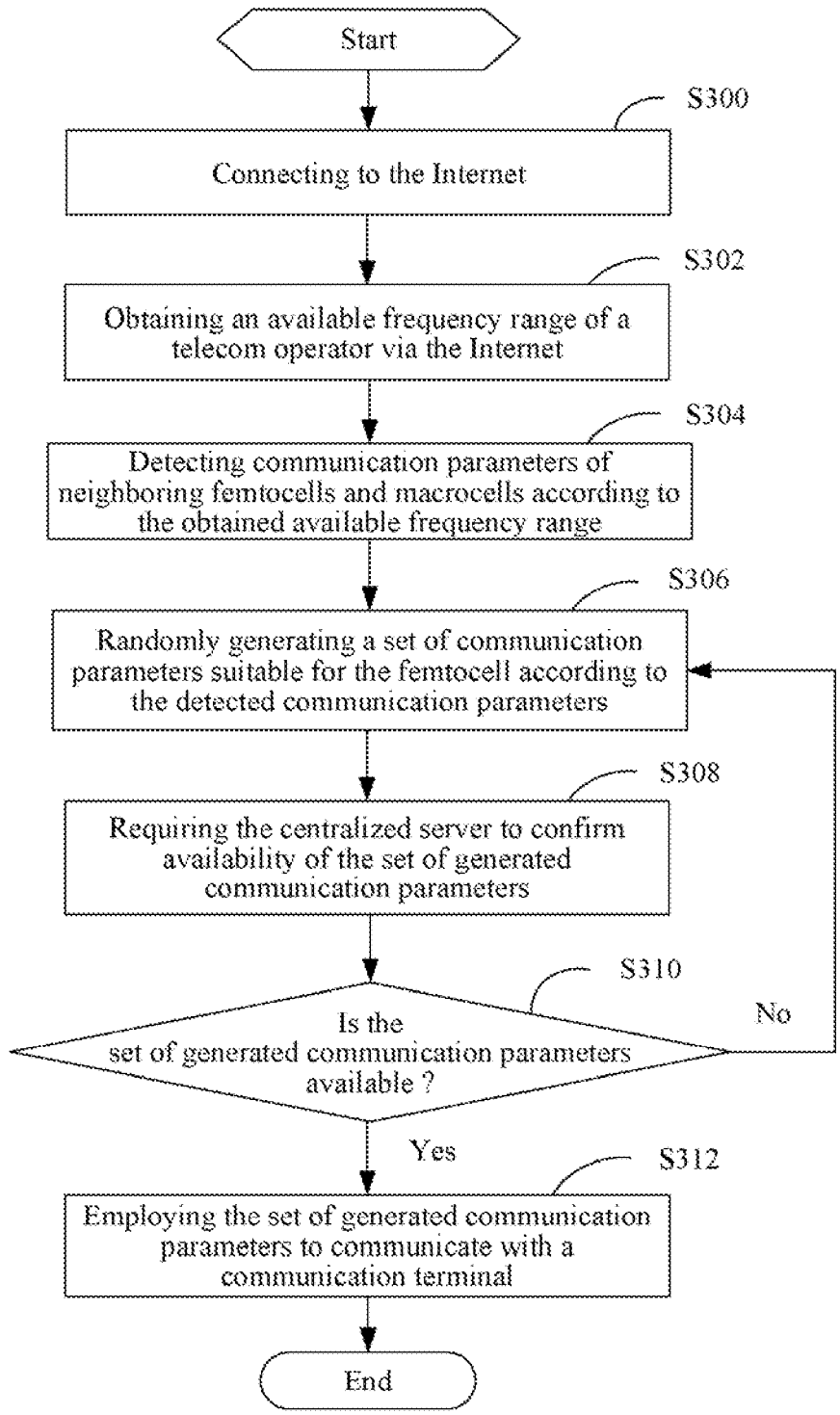
FIG. 3 is a flowchart of one embodiment of a parameter generating method.

FIG. 3 is a flowchart of one embodiment of a parameter generating method. The method may be embodied in the femtocell 10, and is executed by the functional modules such as those of FIG. 2. Depending on the embodiment, additional blocks may be added, others deleted, and the ordering of the blocks may be changed while remaining well within the scope of the disclosure.

In block S300, the connecting module 100 connects to the Internet 20.

In block S302, the connecting module 100 obtains an available frequency range of a telecom operator via the Internet 20.

In block S304, the detection module 102 detects communication parameters of neighboring femtocells 12 and macrocells 40 according to the obtained available frequency range.

In block S306, the generating module 104 randomly generates a set of communication parameters suitable for the femtocell 10 according to the detected communication parameters.

In block S308, the confirmation module 106 requires the centralized server 30 to confirm availability of the set of generated communication parameters. In one embodiment, availability of the set of generated communication parameters indicates that the generated communication parameters are allowed by the centralized server 30 and have not been employed by other femtocells and macrocells that have generated the communication parameters via the centralized server 30. Unavailability of the set of generated communication parameters indicates that the generated communication parameters are not allowed by the centralized server 30 or have been employed by the other femtocells and the macrocells that have generated the communication parameters via the centralized server 30.

In block S310, the confirmation module 106 determines if the set of generated communication parameters is available according to the confirmation.

In block S312, the communication module 108 employs the generated communication parameters to communicate with the communication terminal 50 if available.

In block S306, the generating module 104 randomly generates another set of communication parameters suitable for the femtocell 10 according to the detected communication parameters if the set of generated communication parameters is unavailable.

The femtocell 10 and the parameter generating method of the present disclosure generate a set of communication parameters which is unique and without interference. In addition, the set of communication parameters is confirmed by the centralized server, which avoids interference with other base stations. Furthermore, the femtocell 10 generates the set of communication parameters by itself, which reduces operating time of the centralized server 30 and subsequently improves efficiency of communication system employing the femtocell 10.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A femtocell in communication with a centralized server, the femtocell comprising a processor, a storage system, and one or more programs, wherein the one or more programs are stored in the storage system and operable to be executed by the processor, the femtocell comprising:
   a connecting module operable to connect to the Internet and obtain an available frequency range of a telecom operator via the Internet;
   a detection module operable to detect communication parameters of neighboring femtocells and macrocells according to the obtained available frequency range;
   a generating module operable to randomly generate a set of communication parameters suitable for the femtocell according to the detected communication parameters;
   a confirmation module operable to require the centralized server to confirm an availability or an unavailability of the set of generated communication parameters, wherein the availability of the set of generated communication parameters indicates that the set of generated communication parameters is allowed by the centralized server and has not been employed by other femtocells and macrocells that have generated the communication parameters via the centralized server and the unavailability of the set of generated communication parameters indicates that the set of generated communication parameters is not allowed by the centralized server or has been employed by the other femtocells and the macrocells that have generated the communication parameters via the centralized server; and a communication module operable to use the generated communication parameters to communicate with a communication terminal if the set of generated communication parameters is available.

2. The femtocell as claimed in claim 1, wherein the generating module is further operable to randomly generate another set of communication parameters suitable for the femtocell according to the detected communication parameters if the set of generated communication parameters is unavailable.

3. The femtocell as claimed in claim 1, wherein the communication parameters comprise a universal telecommunication radio access absolute radio frequency channel number and a primary scrambling code.

4. A parameter generating method of a femtocell in communication with a centralized server, comprising:

obtaining an available frequency range of a telecom operator via the Internet;

detecting communication parameters of neighboring femtocells and macrocells according to the obtained available frequency range;

randomly generating a set of communication parameters suitable for the femtocell according to the detected communication parameters;

requiring the centralized server to confirm an availability or an unavailability of the set of generated communication parameters, wherein the availability of the set of generated communication parameters indicates that the set of generated communication parameters is allowed by the centralized server and has not been employed by other femtocells and macrocells that have generated the communication parameters via the centralized server and the unavailability of the set of generated communication parameters indicates that the set of generated communication parameters is not allowed by the centralized server or has been employed by the other femtocells and the macrocells that have generated the communication parameters via the centralized server;

determining if the set of generated communication parameters is available according to the confirmation of the centralized server; and employing the set of generated communication parameters to communicate with a communication terminal if the set of generated communication parameters is available.

5. The method as claimed in claim 4, further comprising randomly generating another set of communication parameters suitable for the femtocell according to the detected communication parameters if the set of generated communication parameters is unavailable.

6. The method as claimed in claim 4, wherein the communication parameters comprise a universal telecommunication radio access absolute radio frequency channel number and a primary scrambling code.

* * * * *